United States Patent

[11] 3,575,310

| [72] | Inventor | Leo H. Albertson |
| | | Rte. 6, Box 470, Lakeview, Oreg. 97630 |
| [21] | Appl. No. | 795,117 |
| [22] | Filed | Jan. 29, 1969 |
| [45] | Patented | Apr. 20, 1971 |

[54] BALE HANDLING VEHICLE
5 Claims, 3 Drawing Figs.

[52] U.S. Cl. .................................................. 214/522,
198/31, 198/88
[51] Int. Cl. .................................................. B60p 1/38
[50] Field of Search .................................................. 214/520,
521, 522, 83.26; 198/20 (T), 31 (A)3, 32, 88

[56] References Cited
UNITED STATES PATENTS
2,761,578  9/1956  Brown et al .................. 214/522X 3,173,564  3/1965  Mayo .......................... 214/522
3,400,840  9/1968  Fischer ........................ 214/520X
3,464,572  9/1969  McWilliams ................. 214/6(K)

FOREIGN PATENTS
69,117  1941  Czechoslovakia ............ 198/20T

*Primary Examiner*—Albert J. Makay
*Attorney*—Woodcock, Kurtz, Washburn & Mackievicz

ABSTRACT: A vehicle for loading and unloading bales of hay comprising a split apron providing a forward conveyor section pivotally fixed at the rear edge and movable at the forward edge to various loading and unloading elevations and providing a rear conveyor section pivotally fixed at the forward edge and movable at the rear edge to the elevation of each of a plurality of conveyorized storage beds.

BALE HANDLING VEHICLE

BACKGROUND OF THE INVENTION

This invention relates to an apparatus and a method for handling bales.

As part of a substantial effort to reduce the cost of farming, various vehicles have been developed for loading and unloading bales of material such as hay. Conventionally, these vehicles include a storage section in which bales of hay may be accumulated as well as a conveyor section which moves the bales between the storage section and a bale depository; i.e., a field. By changing the elevation of that portion of the conveyor section which communicates with the bale depository, the vehicle may be used to load from and unload to bale depositories of various kinds and elevations.

It is desirable that these bale-handling vehicles have a substantial storage capacity. A vehicle capable of handling only a few bales of hay at a time is not particularly useful since such a vehicle is not capable of handling a large number of bales without returning to a bale depository such as a barn at frequent time-consuming intervals. Yet, in spite of the need for greater storage capacity on these vehicles, the prior art has failed to satisfy this need at least to any substantial degree.

For example, certain vehicles of the prior art have provided for a single layer of bales in the storage section, thereby severely limiting the storage capacity. When the vehicle is limited to a single layer of storage, the storage capacity is a function only of the cross-sectional area of the storage section and not the depth. Of course, increases in the cross-sectional area of the storage section result in increases in the length and width of the vehicle. When substantial increases in this storage section are attempted, the vehicle can become unwieldy and generally difficult to manipulate.

In an effort to avoid the storage limitations of a single layer vehicle, certain prior art vehicles have been attempted to stack the bales on a single storage section bed in a plurality of layers by permitting at least a portion of the conveyor section to communicate with various areas of the storage section at various elevations. Although this would appear to increase the capacity of the storage section substantially beyond that of the single layer vehicle, the increased capacity of the storage section is less than optimal since the bales tend toward a random distribution in the storage section unless manhandled. Consequently, there are large spaces left between the bales so that the increased storage capacity is not efficiently utilized.

Furthermore, these vehicles which utilize the random approach to loading the storage section are not readily unloaded since it is difficult to automate the unloading of randomly placed bales of hay other than means of a laborer manhandling each individual bale of hay. Even in those instances in the prior art where the conveyor section can be moved carefully in a time-consuming manner to the various areas within the storage section to permit a uniform rather than random distribution of the bales, unloading is still difficult without the manhandling of each individual bale of hay.

In addition to the failure to provide a substantial storage capacity and the failure to utilize that storage capacity efficiently without rendering loading and unloading difficult, the prior art vehicles do not lend themselves to handling a group of bales simultaneously. The heretofore unsatisfied need for handling a group of bales simultaneously arises in both the loading and unloading situation. In particular, it is sometimes possible to arrange bales of hay in clusters or groups prior to loading, with the plurality of bales in each of the groups, thereby capable of being loaded substantially simultaneously. But since the prior art vehicles are limited to loading on a bale-by-bale basis sequentially rather than loading the bales as a group substantially simultaneously, the loading process is long and frequently tedious. Similarly, bales which have been loaded into the storage section of a prior art vehicle are essentially arranged in a group corresponding to the sole layer or a plurality of groups corresponding to a plurality of layers. But again, since the prior art vehicles are limited to bale handling on a bale-by-bale basis, these vehicles are incapable of unloading the bales as a group.

SUMMARY OF THE INVENTION

In accordance with another object of the invention, there is provided an improved method and apparatus for handling substantial quantities of bales while making efficient use of the bale storage capacity of the apparatus. In the preferred embodiment, a plurality of beds at a plurality of levels in the storage section communicate with the conveyor means so as to assure the efficient use of the storage section capacity. The conveyor means may comprise a first or rear conveyor section adjacent the storage section, including conveying elements, which is pivoted in response to elevating means to communicate with the plurality of beds. The conveyor means may further comprise a second or forward conveyor section, including conveying elements, which is pivoted in response to elevating means between various positions of communication with bale depositories for loading and unloading the bales.

In accordance with a further object of this invention, there is provided a method and apparatus for the fully automated handling of bales arranged in a layered distribution. In the preferred embodiment of the invention, the conveyor means also includes reversible conveying elements located on each of the plurality of beds to permit the unloading of the vehicle by clearing each storage bed of the group of bales gathered thereon. In addition, the conveying elements facilitate the loading of the bales by moving the bales rearwardly as they are fed to the beds by conveying elements of the first and second conveyor sections.

In accordance with a still further object of the invention, there is provided a method and apparatus for handling a plurality of bales simultaneously as a group. In the preferred embodiment, the widths of the first and second conveyor sections are sufficient so as to permit the handling of a plurality of side-by-side bales and thereby permit the handling of a group of bales for each of the plurality of beds at one time. In addition, the conveying elements of the various beds are independently controllable to permit each bed to handle a group of bales independently of the other beds.

DESCRIPTION OF THE PREFERRED EMBODIMENT

Figure 1:
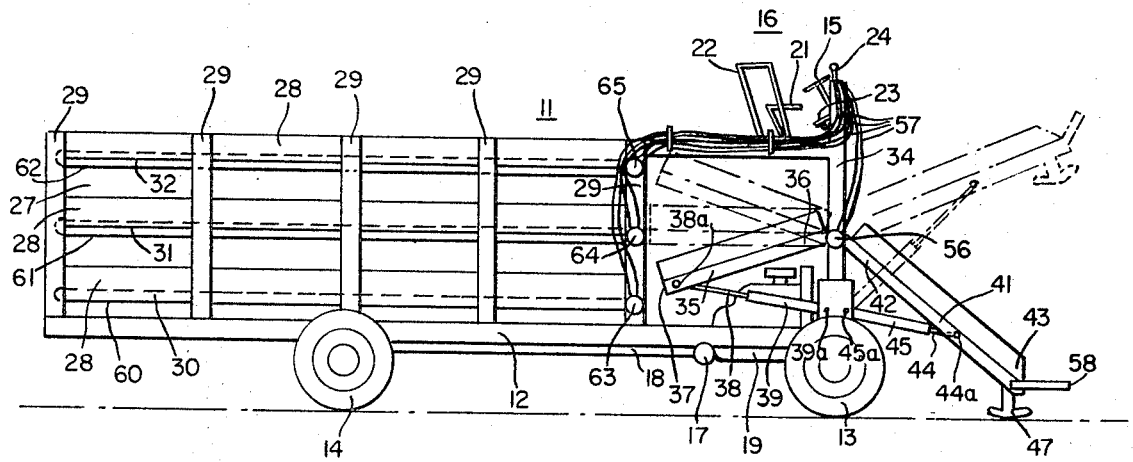
FIG. 1 is a side view of a bale-handling vehicle.

As may be seen by reference to FIG. 1, the invention may be embodied in a bale-handling vehicle 11 which resembles a truck. In particular, the vehicle 11 includes a chassis 12 supported on front wheels 12 and rear wheels 14. The front wheels 13 are connected to a steering wheel 15 at a driver station 16 while the rear wheels are driven by a gasoline engine through a drive shaft 18. The hydraulic pump 17 is also driven by the gasoline engine 19.

Not only does the structure of the vehicle 11 resemble a truck, but the manner in which the vehicle 11 is driven also resembles the manner in which a truck is driven. A driver is positioned in the forward area of the vehicle 11 at the driver station 16 which is somewhat analogous to the cab of a truck. The driver while seated on a seat 21, which is guarded by a rail 22, is able to manipulate foot controls 23 and, of course, the steering wheel 15. By using means of control and other conventional controls not shown, the driver is able to control the direction and speed of the vehicle 11 substantially identically to the manner in which a truck driver controls a truck.

Since it is desirable that the vehicle 11 be capable of handling a large number of bales at a time without resorting to an unwieldy length or width for the vehicle 11, a storage section 27 has been provided which has a depth greater than the thickness of a plurality of bales of hay. As shown, the storage section 27, which is partially enclosed by longitudinally extending wall members 28 and vertically extending slats 29, has a sufficient depth to allow the formation of several layers of bales; in this case, three layers. However, the mere provision of a storage section, which has sufficient depth to handle several layers of bales, does not necessarily assure the efficient use of the storage section capacity in the absence of manhandling bales of hay to obtain an orderly stacking within the storage section.

Therefore, in accordance with one important aspect of this invention, the storage section 27 is tiered with a plurality of beds located at a plurality of levels. In particular, the storage section 27 includes a lower bed 30 guarded by the lower walls 28 extending longitudinally along the sides of the storage section 27. Immediately above the bed 30, but spaced a distance greater than the thickness of a bale therefrom, a middle bed 31 is provided which is guarded by additional walls 28. Similarly, an upper bed 32 is provided more than a bale thickness above the bed 31 to provide the third of the plurality of beds. Thus, by providing artificial separation between the layers in the form of beds 30, 31 and 32, it may be seen that a somewhat orderly layering of the bales and, therefore, efficient use of the storage capacity will result.

In order to achieve the actual loading or unloading of these beds 30, 31 and 32, there are provided conveyor means throughout the vehicle 11. One of these conveyor means comprises a rear apron 35 which is pivotally mounted at its forward edge 36 by a shaft 54 shown in FIG. 2 which is secured to a front frame member 34 of the vehicle 11, while the rear edge is free to move along an arcuate path to establish communication of the rear edge of the apron 35 with each of the beds 30, 31 and 32. As shown in full, the apron 35, which will be referred to as the first conveyor section, is in communication with the lower bed 30. In other words, the rear edge 37 is substantially coplanar with the lower bed 30. The phantom views of the first conveyor section 35 reveal communication established with the middle bed 31 and the upper bed 32 as the rear edge 37 is elevated along the arcuate path.

It will be appreciated that the position of the first conveyor section 35, and thus its selective communication with the beds 30, 31 and 32, is completely under the control of the driver located at the driver station 16. By manipulating one of the hydraulic controls 24 located adjacent the steering wheel 15, he is able to extend and retract a piston 38 with respect to a hydraulic cylinder 39, the piston 38 being pivotally fixed to the first conveyor section at a pin 38a near the rear edge 37. Since the cylinder 39 is pivotally fixed at the forward frame member 34 by a pin 39a, the extension and retraction of the piston 38 within the cylinder 39 serves as an elevating means for the rear edge 37.

The ultimate communication with a bale depository, whether a barn or a field, is made by a front apron serving as a second conveyor section 41. In this case, the rear edge 42 of the second conveyor section 41 is pivotally fixed at the forward frame member 34 by the shaft 54 shown in FIG. 2 while the forward edge 43 is free to move through an arcuate path in response to the extension and retraction of a hydraulic piston 44 within a cylinder 45. In order to achieve the arcuate motion, the piston 44 is pivotally secured to the second conveyor section 41 at a pin 44a and the cylinder 45 is pivotally secured to the front frame member 34 at a pin 45a. When the front edge 43 of the second conveyor section 41 is in the lowermost position as shown in full, the second conveyor section 41 is in communication with a low bale depository surface, such as the ground, and loading or unloading of bales can proceed. When the front edge 43 of the second conveyor section 41 is in the position as shown in phantom and accomplished by the extension of the elevating means in the form of the piston 44 moving through the cylinder 45, the second conveyor section 41 is also capable of unloading and loading bales to and from an elevated surface such as the loft of a barn.

Prior to this point in the specification, the discussion of the conveyor means has been limited to describing the apparatus which permits the establishment of communication between a plurality of beds 30, 31, 32 and various bale depository surfaces. However, it is necessary to establish more than mere communication. It is necessary to move the bales on the conveyor means once communication has been established. In order to understand just how this is accomplished, reference is now made to both FIGS. 1 and 2.

Figure 2:
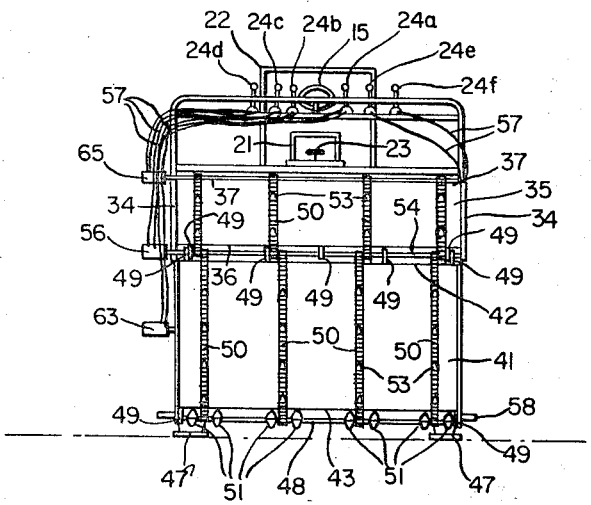
FIG. 2 is a front view of the bale-handling vehicle of FIG. 1.

As seen in FIG. 2, the front edge 43 of the second conveyor section 41 is in the lowermost position so that skids 47 secured at the front edge 43 are close to, if not resting on, the ground. The first conveyor section 35 is shown with the rear edge 37 elevated to communicate with the uppermost bed 32. As may be seen, and in accordance with one aspect of the invention, the width of the first conveyor section 35 and the second conveyor section 41 are substantially coextensive with the width of the beds 30, 31 and 32. Consequently, a group of bales positioned side-by-side may be handled simultaneously on the conveyor sections 35 and 41 so that the bales need not be handled sequentially on a bale-by-bale basis.

Looking now to the details of the conveyor means, it may be seen that the front edge 43 supports a shaft 48 at bearing brackets 49. The shaft 48 includes sprockets not shown which engage sprocket holes in the four chainlike conveying elements 50 of the second conveyor section 41, and in addition supports bale-impaling spurs 51. A drive shaft 54 rotatably secured to the rear edge 42 and the front edge 36 by bearing brackets 49 and to the frame member 34 includes sprockets not shown for engaging the sprocket holes of the conveying elements 50. The shaft 54 is driven by a hydraulic orbit motor 56 connected to the end of the drive shaft 54 and controlled by a hydraulic hand control 24a coupled thereto by one of a plurality of hoses 57 and supplied by the pump 17.

When the hand control 24a is set to the loading position, the motor 56 will start the drive shaft 54 rotating, which in turn moves the conveying elements 50 along the second conveyor section 41 such that bale-engaging prongs 53 on the conveyor section bed move from the front edge 43 to the rear edge 42. Movement of the conveying elements 50 also turn the shaft 48 with the spurs 51. As the vehicle approaches, the rotating spurs 51 impale the bales as they pass between guide rails 58 boosting the bales onto the bed of the second conveyor section 41. The bales are then engaged by the prongs 53 to carry the bales from the front edge 43 to the rear edge 42 where they are passed on to the first conveyor section 35. As with the second conveyor section, the bales are moved along the first conveyor section on the conveying elements 50 including the prongs 53 which are driven by the motor 56 and the drive shaft 55 until the bales reach one of the beds 30, 31 or 32.

In a similar manner, the conveying elements 60, 61 and 62 in the beds 30, 31 and 32 as shown in FIG. 1 are also driven by hydraulic orbit motors 63, 64 and 65 respectively. Each of these orbit motors 63, 64 and 65, supplied by the pump 17, is under the independent control of the hand controls 24b, 24c and 24d, respectively, and are connected to the motors by separate hoses 57. The additional hand controls 24e and 24f shown in FIG. 2 are utilized to independently control the elevating means in the form of combinations comprising the hydraulic piston 38 and cylinder 39 and the hydraulic piston 34 and cylinder 45 supplied by the pump 17 through hoses 57.

Figure 3:
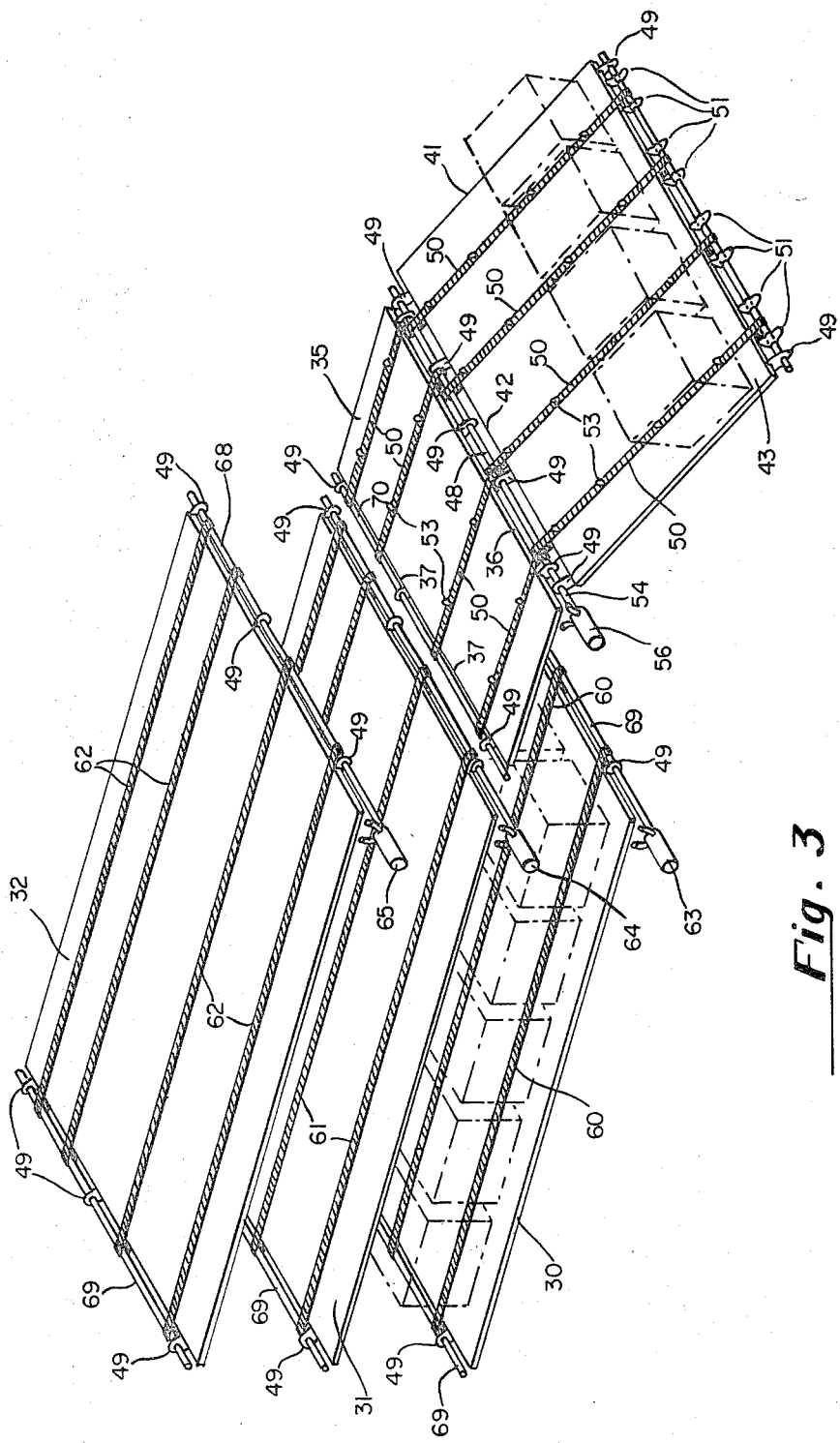
FIG. 3 is a perspective view of the conveyor means and storage beds of the vehicle disclosed at FIGS. 1 and 2.

Reference is now made to FIG. 3 for purposes of more fully illustrating and discussing the conveying elements 60, 61 and 62 of the beds 30, 31 and 32, as well as various aspects of the first conveyor section 35 and the second conveyor section 41. In particular, it may be seen by examining the upper bed 32, that the conveying elements 62 encircle the bed 32, a shaft 68 positioned at the front end of the bed 32, and a shaft 69 positioned at the rear end of the bed 32. As in the case of first and second conveyor sections 35 and 41, the shafts 68 and 69 are mounted on the bed 32 by bearing brackets 49. The shaft 68, which is the drive shaft, is mechanically coupled to the hydraulic orbit motor 63 by hydraulic connections only partially shown in order to simplify the drawing. Sprockets not shown are included on the shaft 68, as well as the shaft 69, for cooperation with sprocket holes in the conveying elements 62. Similar shafts 68 and 69 are supported by bearing brackets 49 on the other beds 30 and 31. A shaft 70 substantially identical to the shafts 68 and 69, as well as the shaft 48, is shown as rotatably secured to the rear edge 37 of the first conveyor section 35 by the bearing brackets 49.

It will be appreciated that, in accordance with one important aspect of the invention, the independently controllable orbit motors 56, 63, 64 and 65, as well as the independently controllable elevating means in the form of the hydraulic piston-cylinder combination 38—39 and 44—45 are particularly adapted to the handling of groups of bales. For example, the elevating means comprising the piston-cylinder combination 38—39 may be controlled to establish communication between the first conveyor section 35 and the bed 30 while the elevating means comprising the piston-cylinder combination 44—45 may be controlled to establish communication with a bale depository such as the ground or other surface supporting the vehicle. If the bales are clustered in a group on the ground, the entire group may be loaded substantially simultaneously by activating the conveyor elements 50 of the first and second conveyor sections 35 and 41 as well as the conveyor elements 60 of the bed 30. As the vehicle advances, the spurs 51 will impale the bales to boost them onto the second conveyor section 41. If the bales are clustered in groups of four bales wide and one, two, three, four or five bales long, the bed 30 may be filled as illustrated by loading the bales by groups rather than on a bale-by-bale basis until a total of 20 bales has been accumulated on the bed 30. This may be done with a single pass if the bales are clustered in a four-by-five group, totaling 20 bales. The elevating means may then establish communication between the first conveyor section 35 and the bed 31, while the second conveyor section 41 remains in communication with the ground as shown in FIG. 3. Once again, the vehicle 11 with the conveying elements 50 of the first and second conveyor sections 35 and 41 and the conveying elements 61 activated, while the independently controlled conveying elements 60 remain stationary, will permit the bed 31 to be filled on a group basis if the bales are clustered in groups four bales wide and one, two, three, four or five bales long. The same procedure may be followed to fill the bed 32. Note that it may be desirable to operate the conveying elements of the bed being filled intermittently to permit the bales to be bunched on the bed, particularly where the vehicle 11 does not utilize a tailgate.

To perform an unloading operation of the bales, the conveying elements 63, 64 and 65 are sequentially reversed and each group of 20 bales will be carried away from the respective beds by the reversed conveying elements 50. With the second conveyor section 41 in the position illustrated in FIG. 3, the bales will be unloaded to the ground; and if the truck is moving in the reverse direction closely enough, the bales will be clustered in a group of 20, 40 or 60. By elevating the second conveyor section 41, the bales may be unloaded to a bale depository having an elevated surface.

Thus, it has been illustrated that the vehicle 11 is capable of loading and unloading bales of hay or the like on a group basis rather than on a bale-by-bale basis. However, the invention is not limited to bale handling on a group basis but is in fact readily usable on a bale-by-bale basis. In other words, a single bale may be handled at a time both in the loading and unloading process.

Since it might be desirable to advance a single bale to the rear end of any of the beds 30, 31 and 32 and subsequently load additional bales on that same bed, it may be desirable to utilize a tailgate not shown so as to prevent the first-loaded bales from passing along a bed and dropping off the rear end of that bed. For example, it may be desirable to block the rear end of each bed with a chain stretched from one side to the other side. This will prevent the bales from spilling out the rear of each bed.

In the absence of tailgates or with the chains removed, the vehicle may be used for automating cattle feeding. If the beds 30, 31 and 32 are filled with bales having the baling twine or wire removed and the conveying elements 60, 61 and 62 are reversed, bales will spill out the rear and break open when striking the ground as the vehicle 11 moves forward.

Although a specific embodiment of the invention has been disclosed, it should be appreciated that many modifications may be made without departing from the spirit and scope of this operation.

I claim:

1. A vehicle for transporting bales of hay and the like comprising:
    a storage section including a plurality of beds at a plurality of levels;
    a conveyor means including a first conveyor section having one end nearer said storage section than another end and further including a second conveyor section having one end more remote from said storage section than another end, said one end of said first conveyor section movable to a plurality of elevations to communicate with each of said plurality of beds at said plurality of levels, said one end of said second conveyor section movable to various elevations, said other end of said first section and said other end of said other section pivotally mounted at a fixed elevation such that said other end of said first section is in communication with said other end of said second section; and
    an elevating means coupled to said one end of said first section for movement thereof to a plurality of elevations to permit the conveying of bales between said one end of said first section and said plurality of beds and coupled to said one end of said second section for movement thereof to said various elevations.

2. The bale-handling vehicle of claim 1 wherein said elevating means permits the independent control of the elevation of said one end of said first section and the elevation of said one end of said second section.

3. The bale-handling vehicle of claim 1 wherein said conveyor means includes conveying elements on each of said beds which are mutually independently controllable and independently controllable from said first conveyor section and said second conveyor section.

4. The bale-handling vehicle of claim 1 wherein the width of said conveyor means is substantially coextensive with the width of said beds.

5. The bale-handling vehicle of claim 1 wherein said conveyor means includes conveying elements along each of said beds for moving bales through each of the beds.